United States Patent [19]
Weible

[11] 3,798,926
[45] Mar. 26, 1974

[54] UNIVERSAL JOINT CONSTRUCTION
[75] Inventor: Warren W. Weible, Defiance, Ohio
[73] Assignee: The Zeller Corporation, Defiance, Ohio
[22] Filed: July 21, 1972
[21] Appl. No.: 274,087

[52] U.S. Cl. .................................. 64/17 A, 308/207
[51] Int. Cl. ................................................ F16d 3/26
[58] Field of Search .............. 64/17 R, 17 A, 17 SP; 308/207; 180/48, 47, 46

[56] References Cited
UNITED STATES PATENTS
| | | | |
|---|---|---|---|
| 1,380,270 | 6/1921 | Swenson | 64/17 R |
| 1,615,317 | 1/1927 | Swenson | 64/17 R |
| 1,685,510 | 9/1928 | Thiemer | 64/17 R |

FOREIGN PATENTS OR APPLICATIONS
| | | | |
|---|---|---|---|
| 1,159,857 | 7/1958 | France | 64/17 A |

Primary Examiner—Benjamin W. Wyche
Assistant Examiner—Randall Heald
Attorney, Agent, or Firm—Allen D. Gutchess, Jr.

[57] ABSTRACT

A universal joint construction is provided which includes a replacement bearing cup capable of being assembled with a yoke and trunnion in a predetermined position. The assembly can take place in the field or shop without special machines or equipment. The replacement bearing cup has a threaded outer portion which is engaged by internal threads of a member positioned at least partially in the bore of the yoke arm and engageable with the cup threads. The threaded member is effective to hold a portion of the cup against a locating surface of the yoke in order to place the cup in a predetermined position relative to the yoke and the trunnion.

23 Claims, 11 Drawing Figures

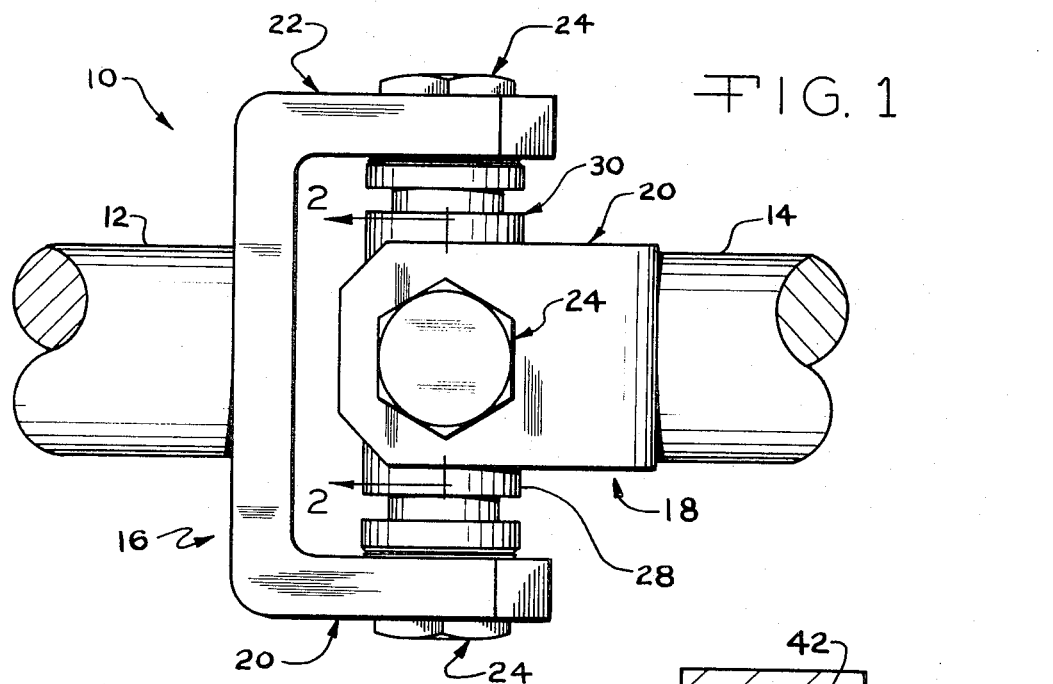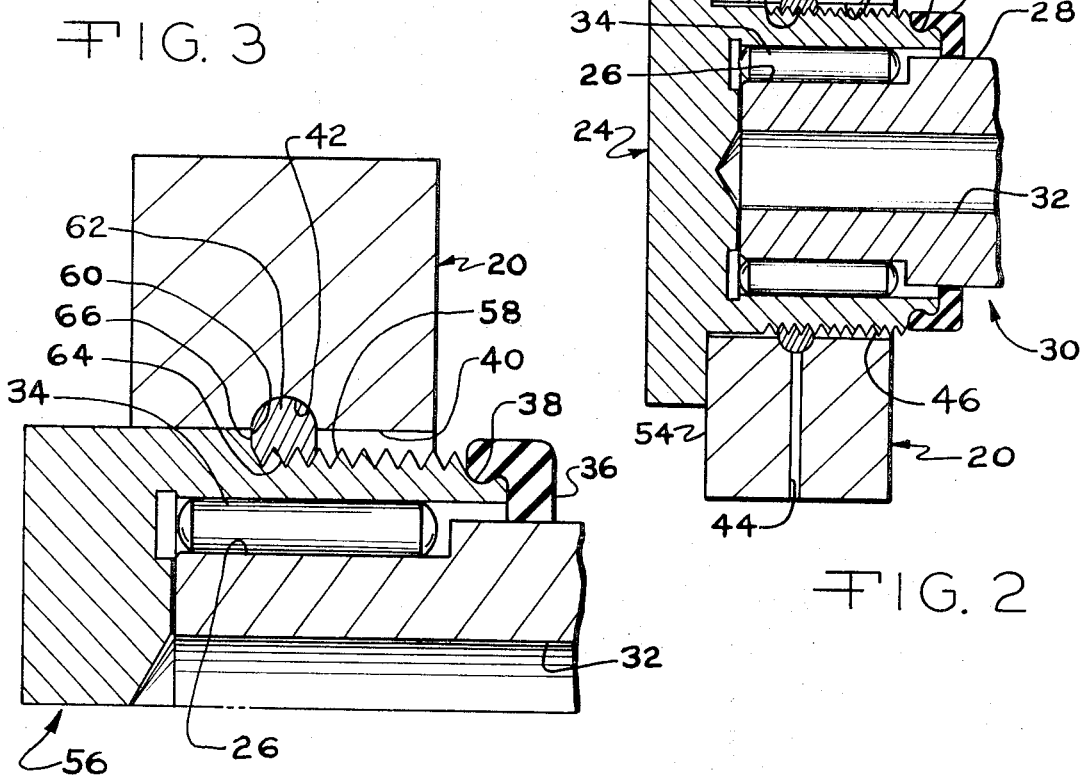

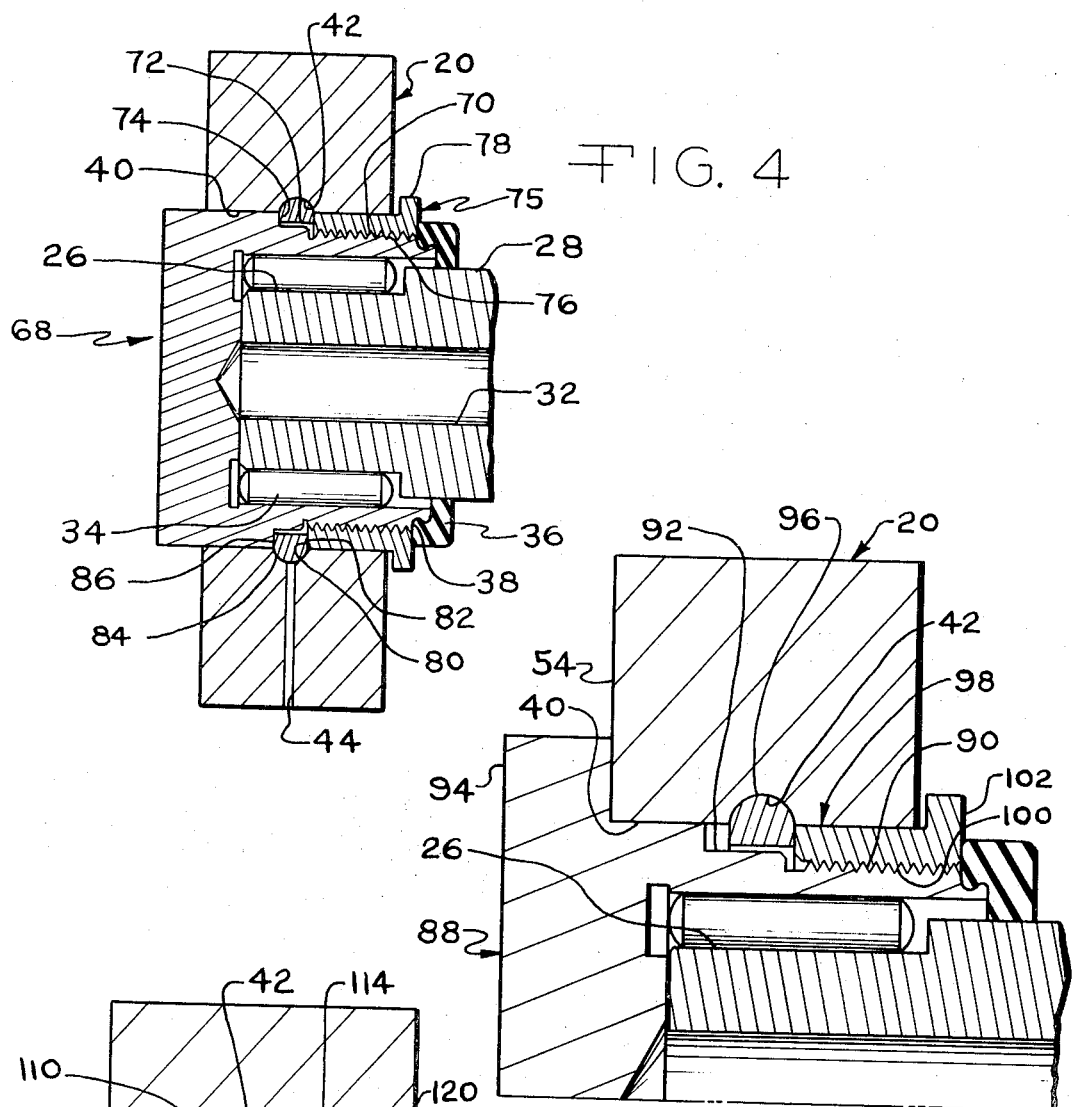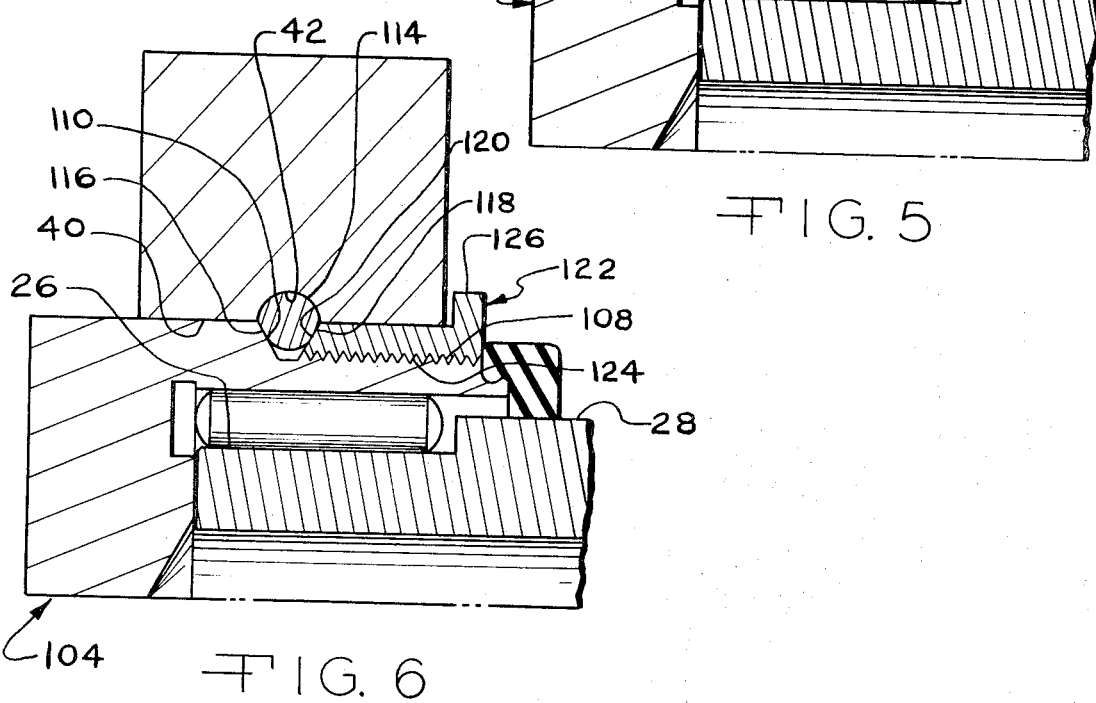

UNIVERSAL JOINT CONSTRUCTION

This invention relates to a universal joint construction and more particularly to replacement bearing cups for universal joints.

It is now common in the design of universal joints to hold the bearing cup in the yoke arm by means of a plastic ring located in part in a groove in an intermediate portion of a bore in the yoke arm and in part in a corresponding groove on the outer surface of the bearing cup. The plastic ring is formed by positioning the cup in the bore and by injecting plastic material through a small passage in the yoke arm into the matching grooves. This provides an inexpensive yet secure and accurate means of assembling and affixing the cup in the yoke arm. However, when the universal joint is to be repaired, a problem is presented because the plastic injection machines for the plastic ring are not readily available in the field or shop. Further, the hardened plastic material in the yoke arm passage would also have to be cleaned out prior to the injection of new plastic material, a difficult job at best.

The present invention is concerned with replacement bearing cups for universal joints. For some universal joints, the outer surface of the yoke arm is machined to establish an accurate locating surface by means of which a replacement bearing cup can be positioned. With such an arm, either the outer surface or the groove located intermediate the bore can be used as a locating surface to accurately position a replacement bearing cup.

Basically, the replacement bearing cups according to the invention have outer threaded surfaces which are threadedly engaged by internal threaded surfaces of annular threaded members which are located at least partially within the bores of the yoke arm, between the bores and the cups. Tightening of the cups relative to the threaded members causes selected portions of the cups to engage or be aligned with locating surfaces, these surfaces being either the outer machined surfaces of the yoke arm or the intermediate annular grooves in the bores in which are positioning means or rings engaging intermediate shoulders of the bearing cups. With the arrangement of the present invention, bearing cups and cross members can be readily replaced without any special tools being required. The replacement also can be achieved with a minimum amount of time and labor.

It is, therefore, a principal object of the invention to provide replacement bearing cup assemblies for universal joints of the type having intermediate grooves in the yoke arm bores, which grooves are effective to hold the original bearing cups in the yoke arms.

Another object of the invention is to provide a universal joint with replacement bearing cups which can be installed without the need for special tools or machines.

A further object of the invention is to provide replacement bearing cups for yoke arms having outer machined, locating surfaces.

Yet another object of the invention is to provide replacement bearing cups which can be installed with a minimum amount of time and labor.

Many other objects and advantages of the invention will be apparent from the following detailed description of preferred embodiments thereof, reference being made to the accompanying drawings, in which:

FIG. 1 is a side view in elevation of a universal joint embodying the invention;

FIG. 2 is an enlarged view in cross section, taken along the line 2—2 of FIG. 1, of a replacement bearing cup assembly according to the invention;

FIG. 3 is a further enlarged view, similar to the upper half of FIG. 2, of a modified replacement bearing cup assembly according to the invention;

FIG. 4 is a view similar to FIG. 2 of a modified bearing cup assembly according to the invention;

FIGS. 5 and 6 are further enlarged views, similar to the upper half of FIG. 4, of modified bearing cup assemblies according to the invention;

Figure 7:
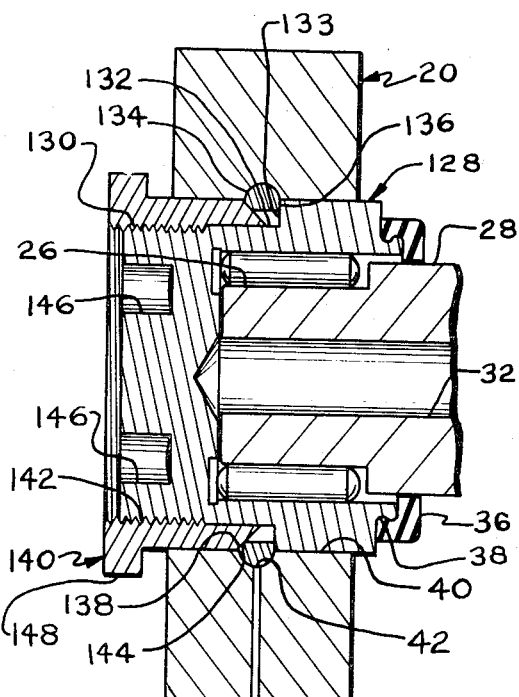
FIG. 7 is a view similar to FIG. 2 of a modified bearing cup assembly according to the invention.

Referring to the drawings, and more particularly to FIG. 1, a universal joint embodying the invention is indicated at 10 and connects driving and driven members 12 and 14 in the usual manner. The universal joint 10 includes two yokes 16 and 18 disposed at mutually perpendicular angles, each having arms 20 and 22 holding bearing cups 24. The bearing cups 24 receive trunnions 26 (see also FIG. 2) which extend outwardly from a body 28 of a cross member 30. The cross member 30 can be a conventional design and provided with lubrication passages 32 which can communicate with a grease fitting (not shown) to supply lubricant to roller or needle bearings 34 disposed between the cups and the trunnions 26. Suitable resilient seals 36 are held in grooves 38 at the inner or open ends of the cups 24 and bear against a portion of the cross member body 28 to retain the lubricant in the cups 24.

The original bearing cup employed in a bore 40 of the yoke arms 20 and 22 was of a conventional design with a smooth cylindrical outer surface except for an annular intermediate groove therein. That groove matched an intermediate annular groove 42 in the bore 40 when the original bearing cup was properly positioned in the bore 40. With the two grooves aligned, a plastic material was then injected through a suitable small passage, such as a passage 44, in the yoke arm, with this plastic material completely filling the matching annular grooves and forming a plastic ring therein. This type of mounting for the bearing cup constituted an inexpensive, quick, and accurate means for holding the original cup in the yoke arms 20 and 22.

From time to time, it is necessary to replace the bearing cups and the cross members due to wear of the trunnions, cups, and bearings. The original cups can be forced out of the bores 40 in the yoke arms 20 by applying sufficient pressure to shear the plastic rings. However, installing replacement bearing cups in the field or in the shop presents another problem because plastic injection machines are not readily available by means of which new plastic material can be inserted in the bore groove 42 and a matching groove in the bearing cup. Further, the passage 44 or whatever similar passage is used also would require being cleaned out in order to inject the new plastic material.

The replacement bearing cup 24 embodying the invention achieves the desired characteristics needed for relatively easy and simple replacement. The bearing cup 24 and the others to be subsequently discussed all can be assembled by being inserted into the bore 40 from outside the arms 20 and 22. This is a necessity in order to be able to assemble the bearing cups with the trunnions 26 of the cross members 30 and with the yokes 16 and 18. The bearing cups can also be assembled without any special tools being required at all. In addition, the replacement bearing cups can be accurately assembled with the yoke arm, which is necessary in order to obtain proper clearance between the cross members and the bearing cups.

To achieve these desiderata, the bearing cup 24 has an outer threaded portion 46 located at least partially in the bore 40. The cup 24, in this instance, also has a non-circular flange 48 at the outer end thereof, which flange has at least one transverse dimension exceeding the diameter of the bore 40. A split ring or nut 50 is positioned in the annular groove 42 in the bore 40 and has internal threads 52 which threadedly engage the threaded portion 46 of the replacement cup 24. The split ring 50 tends to assume a diameter larger than the bore 40. Consequently, to assemble the ring 50 with the yoke arm 20, the ring 50 is compressed and pushed into the bore 40 until it is aligned with the groove 42, at which time it springs outwardly into the groove 42 to assume the position therein as shown in FIG. 2, with the internal threads 52 projecting inwardly slightly beyond the surface of the bore 40.

Assuming that the opposite trunnion 26 has been assembled with the cup 24 in the other yoke arm 22, the trunnion 26 of FIG. 2 is aligned in the bore 40 and the bearing cup 24 pushed partly into the bore 40 and over the trunnion 26. At this time, the resilient seal 36 in the groove 38 can be pushed over the cross member as the trunnion and cup are assembled. The bearing cup 24 is moved into the bore until the threaded portion 46 is engaged with the internal threads 52 of the split ring 50. The cup 24 is then turned with the aid of the non-circular flange 48 until the inner surface of the flange 48 contacts an outer machined surface 54 of the yoke arm 20. The engagement of the flange 48 with the surface 54 thereby provides accurate positioning of the bearing cup 24 relative to the trunnion 26 and the cross member 30. Further, only a wrench is needed to assemble the bearing cups with the yoke arms 20 and 22 and trunnion 26.

A modified replacement cup assembly is shown in FIG. 3. Basically, this assembly differs from that of FIG. 2 in that the annular groove 42 in the yoke arm 20 is employed to provide the locating surface for the bearing cup rather than the outer machined surface 54 of the arm 20. This assembly includes a modified replacement bearing cup 56 with an outer threaded portion 58, which is shorter than the threaded portion 46 of the cup 24, and terminates in a distinct shoulder 60. The outer or closed end of the cup 56 can be noncircular if desired but does not include a flange similar to the flange 48. A split ring or nut 62 is positioned in the annular groove 42 and has internal threads 64 which threadedly engage the threaded portion 58 of the replacement cup 56. The split ring 62 can be assembled in the same manner as the ring 50. The ring 62 also has a flat surface 66 which extends perpendicularly into the bore 40 from the outer juncture of the groove 42 and the bore 40.

The bearing cup 56 is assembled with the trunnion 26 of the cross member 30 generally in the same manner as is the replacement cup 24 of FIG. 2. However, the bearing cup 56 is turned, when the threaded portion 58 is engaged with the internal threads 64 of the ring 62, until the shoulder 60 contacts the flat surface 66 of the ring 62. The engagement of the shoulder 60 with the ring surface 66 thereby provides accurate positioning of the bearing cup 56 relative to the trunnion 26 and the cross member 30. Again, only a wrench is needed to effect the assembly of the bearing cups, yoke arms, and trunnions.

The bearing cup assemblies shown in FIGS. 4–6 employ inner sleeve nuts with internal threaded surfaces in place of the internal threaded rings 50 and 62. Referring to FIG. 4, a replacement bearing cup 68 includes an outer threaded portion 70 located at least partially in the bore 40. The cup 68 also has a cylindrical portion 72 at the inner end of the threaded portion 70 with a shoulder 74 adjacent the cylindrical portion. A sleeve nut 75 with internal threads 76 and a noncircular flange 78 extends into the bore 40 from the inner side of the yoke arm 20. A squared inner end 80 of the sleeve nut contacts a flat, annular, inner surface 82 of a split ring 84 located in the groove 42. The ring 84 also has a flat, annular, outer surface 86 which is designed to engage the shoulder 74 of the bearing cup 68. The cylindrical portion 72 has a width narrower than the split ring 84 so that proper engagement of the ring with the sleeve nut and shoulder can occur.

In the assembly of the replacement bearing cup 68 with the trunnion 26 and the yoke arm 20, the seal 36 and the sleeve nut 75 are first placed over the trunnion 26 and part of the body 28 of the cross member 30. The split ring 84 is placed in the groove 42, and the trunnion 26 is then inserted into the bore 40 and the bearing cup 68 placed thereover from the outer side. The sleeve nut 75 is then moved into engagement with the threaded portion 70 of the cup 68 and turned thereon until the squared end 80 of the nut 75 engages the surface 82 of the ring 84. Further turning then moves the shoulder 74 against the ring surface 86. The groove 42 thereby serves as a locating surface in cooperation with the shoulder 74 of the bearing cup 68 through the split ring 84.

Referring to FIG. 5, a replacement bearing cup 88 has a threaded portion 90 located at least partially in the bore 40. At the end of the threaded portion 90 is a cylindrical portion 92 similar to but wider than the cylindrical portion 72 of the cup 68. The cup 88, in this instance, has a noncircular flange 94 at the outer end, which flange has at least one transverse dimension exceeding the diameter of the bore 40. A split ring 96 is positioned in the annular groove 42 and is engaged by an end of a sleeve nut 98 having an internal threaded portion 100 and a noncircular flange 102.

With this assembly, after the ring 96 is placed in the groove 42, the trunnion is inserted in the bore 40. The replacement bearing cup 88 is inserted into the bore over the trunnion 26 and the sleeve nut 98 is brought into engagement with the threaded portion 90 of the cup 88. The sleeve nut is turned on the threaded portion until the end of the sleeve nut 98 contacts the split ring 96, thereby moving the bearing cup 88 into the bore 40. This movement occurs until the flange 94 contacts the machined surface 54 of the arm 20 which serves as a locating surface. In this instance, the cylindrical portion 92 of the bearing cup 88 is wider than the split ring 96 so that the ring 96 does not engage any locating surface nor act as a positioning element for the bearing cup 88.

Referring to FIG. 6, a replacement bearing cup 104 has an externally-threaded portion 108 at least partially in the bore 40 and terminating in a slanted shoulder 110. A split ring 114 is located in the bore 42 and has an outer slanted surface 116 cooperating with the slanted shoulder 110. The split ring 114 also has an inner slanted surface 118 which cooperates with a slanted end 120 of a sleeve nut 122. The sleeve nut 122 also has an internally threaded portion 124 and a non-circular flange 126. The assembly of FIG. 6 is assembled similar to the assembly of FIG. 4 with the slanted end 120 of the sleeve nut 122 urging the split ring 114 outwardly into the groove 42, and with the slanted surface 116 of the ring 114 thereby enabling the groove 42 to serve as a locating surface with respect to the bearing cup 104 through the slanted shoulder 110 thereof.

Figure 8:
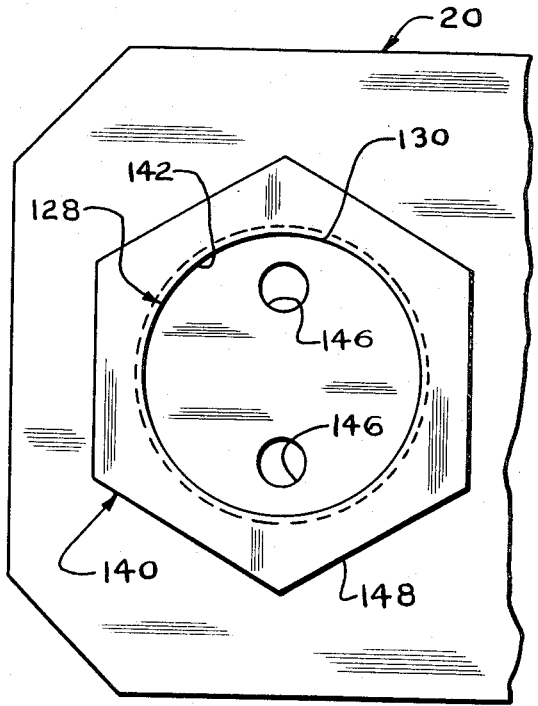
FIG. 8 is a left-end view of the bearing cup assembly of FIG. 7.

In the embodiments of FIGS. 7–11, an outer sleeve nut is used to position and retain the replacement bearing cup. Referring to FIGS. 7 and 8, a replacement bearing cup 128 includes an outer threaded portion 130 located at least partially in the bore 40. An intermediate cylindrical portion 132 is located at the end of the threaded portion 130 with the portion 132 terminating at an annular shoulder 133. A split ring 134 is positioned in the annular groove 42 and normally is supported in the cylindrical portion 132 of the bearing cup 128. Unlike the rings of the embodiments of FIGS. 1–6, the outer diameter of the ring 134 is preferably no larger than the diameter of the bore 40 when in its unstressed condition. The split ring 134 has an annular inner surface 136 extending perpendicularly to the bore and has an outer slanted surface 138. A sleeve nut 140 has an internal threaded portion 142 which is threadedly engaged with the threaded portion 130 of the cup 128. The sleeve nut has an inner slanted end 144 which cooperates with the slanted surface 138 of the split ring 134 to force the ring outwardly into the groove 42 when the nut 140 is turned onto the threaded portion 130 of the bearing cup 128. This forces the ring into the groove and moves the surface 136 of the ring against the shoulder 133 of the cup 128 to provide a locating surface through the cooperation of the groove 42 and the shoulder 133. A spanner wrench or similar suitable tool can be inserted into recesses 146 in the closed end of the cup 128 to hold the bearing cup stationary relative to the sleeve nut 140 when the two are assembled after the bearing cup is inserted in the bore 40 over the trunnion 26. The nut 140 is turned by means of a non-circular flange 148. When the sleeve nut 140 is unscrewed, the ring 134 will contract out of the groove 42 to its unstressed position on the groove portion 132 so that the cup 140 can be removed from the bore 40 for repair.

Figure 9:
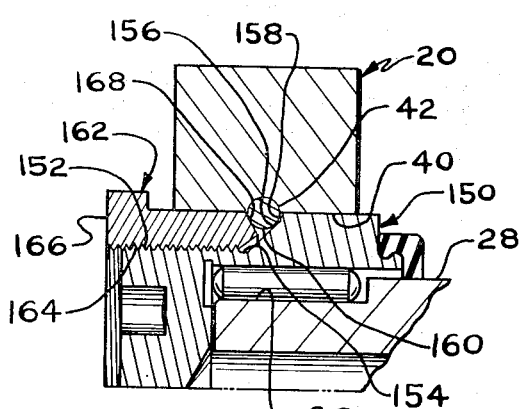
FIG. 9 is a view similar to the upper half of FIG. 7, of a slightly modified bearing cup assembly according to the invention.

Referring to FIG. 9, the bearing cup assembly is generally similar to that of FIGS. 7 and 8 except for employing a split ring of conventional circular cross-sectional shape. A bearing cup 150 includes an outer threaded portion 152 at least partially in the bore 40 and an intermediate groove 154 at the end of the threaded portion terminating in a slanted shoulder 156 and a locating shoulder 158. A split ring 160 of generally circular transverse configuration has an outer diameter no larger than the diameter of the bore 40 when in an unstressed condition and rests in the groove 154 when the bearing cup 150 is inserted in the bore 40. A sleeve nut 162 has an internal threaded portion 164 and a non-circular flange 166. The sleeve nut also has an inner slanted end 168 which is effective along with the slanted shoulder 156 to engage the split ring 160 and move it outwardly into the groove 42. The groove 42 and the outer locating shoulder 158 of the bearing cup 150 thereby cooperate through the split ring 160 to provide a locating means for the bearing cup 150. The bearing cup 150 can have recesses similar to the recesses 146 or other means to hold the bearing cup stationary when the sleeve nut 162 is turned thereon into the bore.

With the assemblies of FIGS. 7 and 9, the outer diameter of the bearing cup, at least at the portion receiving the split ring 134 or 160 must be small enough to receive the ring between the cup and the bore 40, since the cup and the ring must be assembled from outside the yoke arms 20 and 22. To prevent undue weakening of the cup, the rings 134 and 160 can be segmented or metal balls similar to bearing balls can be employed in place of the rings with these balls being supplied through longitudinal grooves in the bearing cups rather than annular grooves or clearances extending completely therearound.

Figure 11:
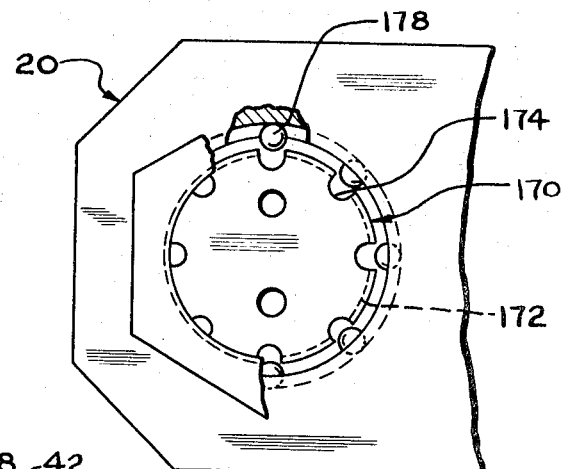
FIG. 11 is a left-hand view of the assembly of FIG. 10, with parts broken away and with parts in section.
Figure 10:
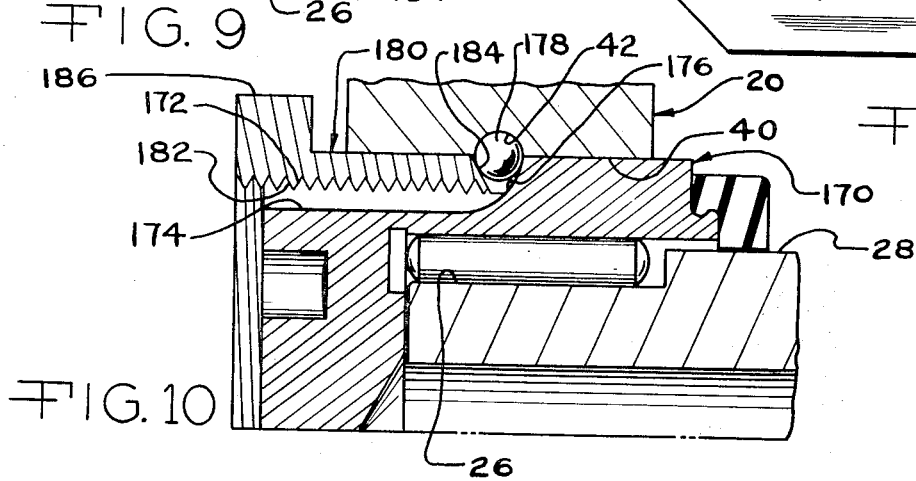
FIG. 10 is a view similar to FIG. 9 but on a further enlarged scale and employing balls in place of a snap ring.

A construction of this type is shown in FIGS. 10 and 11. In this instance, a bearing cup 170 has an outer threaded portion 172 interrupted by a plurality of longitudinally-extending grooves 174 located uniformly therearound and terminating in curved or tapered ends 176. The grooves can be formed in the cup by suitable means such as by milling, for example. A ball 178 can then be dropped into each of the grooves 174 when the bearing cup 170 is in place in the bore 40 over the trunnion 26. A sleeve nut 180 has a threaded internal portion 182, a slanted end 184, and an outer non-circular flange 186. With the balls 178 in the grooves 174, the sleeve nut 180 is turned on the threaded portion 172 with the slanted end 184 forcing the balls 178 into the annular groove 42. These balls then enable the cup to be accurately located relative to the yoke by cooperation of the balls with the groove 42 and the ends 176 of the longitudinal grooves 174.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A universal joint comprising a yoke having a transverse bore and an annular groove at an intermediate location in said bore, a bearing cup in said bore, the outer surface of said bearing cup having a threaded portion, and a member of circular transverse cross-sectional shape having internal threads at least partially in said bore between said cup and said bore and threadedly engaged with said threaded portion to hold said cup in a fixed, predetermined position in said bore.

2. A universal joint according to claim 1 characterized by said cup having a flange engaged with an outer surface of said yoke to hold said cup in the predetermined position.

3. A universal joint according to claim 1 characterized by said bearing cup having a noncircular, outer, closed end extending beyond an outer surface of said yoke.

4. A universal joint according to claim 1 characterized by said threaded member being a split ring with an annular inner surface having said internal threads, said ring being engaged in the annular groove in said yoke bore.

5. A universal joint according to claim 4 characterized by said cup threaded portion terminating at a shoulder at an intermediate portion of said cup, and said ring having a surface engaged with said shoulder to hold said cup in the predetermined position.

6. A universal joint according to claim 4 characterized by said cup having a flange at the closed end thereof, which flange has at least one transverse dimension exceeding the diameter of said bore, said flange engaging an outer surface of said yoke to hold said cup in the predetermined position.

7. A universal joint according to claim 1 characterized by said threaded portion terminating near a shoulder at an intermediate portion of said cup, a ring in said groove, said threaded member having a surface engaging said ring.

8. A universal joint according to claim 7 characterized by said threaded member being effective to position said cup shoulder in engagement with said ring.

9. A universal joint according to claim 7 characterized by said cup having a flange, said threaded member being effective to position said flange in engagement with an outer surface of said yoke.

10. A universal joint according to claim 1 characterized by said bearing cup having at least one longitudinally-extending groove therein terminating near said annular groove, and a spherical member partly in each of said longitudinally-extending and said annular grooves and maintained therein by said threaded member.

11. A universal joint according to claim 10 characterized by said threaded portion having a width at least equal to the length of said longitudinally-extending groove.

12. A universal joint comprising a yoke having a transverse bore, a bearing cup in said bore, said cup having an external threaded portion, and a threaded member separate from said yoke and said bearing cup and having internal threads engaged with said threaded portion of said cup to hold said cup in a fixed, predetermined position in said bore.

13. A universal joint according to claim 12 characterized by said cup having a flange engaged with an outer surface of said yoke to hold the said cup in the predetermined position.

14. A universal joint according to claim 12 characterized by said bearing cup having a noncircular, outer, closed end extending beyond an outer surface of said yoke 15. A universal joint according to claim 12 characterized by said bore having an annular groove at an intermediate location therein, said threaded member being a split ring with an annular inner surface having said internal threads, said ring being engaged in the annular groove in said bore.

16. A universal joint according to claim 15 characterized by said threaded portion of said cup terminating at a shoulder at an intermediate portion of said cup, said ring having a surface engaged with said shoulder to hold said cup in the predetermined position.

17. A universal joint according to claim 15 characterized by said cup having a flange at the outer end thereof, which flange has at least one transverse dimension exceeding the diameter of said bore, said flange engaging an outer surface of said yoke to hold said cup in the predetermined position.

18. A universal joint according to claim 12 characterized by said bore having an annular groove at an intermediate location therein, said threaded portion terminating near a shoulder at an intermediate portion of said cup, and a ring in said groove, said threaded member having a surface engaging said ring.

19. A universal joint according to claim 18 characterized by said threaded member being effective to position said cup shoulder in engagement with said ring.

20. A universal joint according to claim 12 characterized by said bore having an annular groove at an intermediate portion thereof, said bearing cup having a plurality of longitudinally-extending grooves spaced therearound and terminating near said annular groove, and a plurality of spherical members partly in said annular groove and partly in said longitudinally-extending grooves and held in position by said threaded member.

21. A bearing cup for a universal joint, said cup having an open end and a closed end and having an outer cylindrical surface, and a threaded portion extending from one end at least to an intermediate portion of said cup, said bearing cup having a longitudinally-extending groove extending from one end thereof to an intermediate portion of said cup.

22. A bearing cup according to claim 21 characterized by said longitudinally-extending groove extending from the closed end of said cup.

23. A bearing cup according to claim 21 characterized by said threaded portion extending from the closed end of said cup to the intermediate portion thereof and having a width at least equal to the length of said longitudinally-extending groove.

* * * * *